United States Patent
Long et al.

(10) Patent No.: US 8,406,124 B2
(45) Date of Patent: Mar. 26, 2013

(54) METHOD AND NETWORK DEVICE FOR REALIZING SHARED MESH PROTECTION

(75) Inventors: Hao Long, Shenzhen (CN); Jixiong Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 338 days.

(21) Appl. No.: 12/787,068

(22) Filed: May 25, 2010

(65) Prior Publication Data
US 2010/0232287 A1    Sep. 16, 2010

Related U.S. Application Data

(63) Continuation of application No. PCT/CN2008/073623, filed on Dec. 19, 2008.

(30) Foreign Application Priority Data

Dec. 27, 2007 (CN) .......................... 2007 1 0306902
Jan. 15, 2008 (CN) .......................... 2008 1 0002355

(51) Int. Cl.
*G01R 31/08* (2006.01)
(52) U.S. Cl. .................................................. 370/220
(58) Field of Classification Search .............. 370/203, 370/204–215, 216–228, 229–240, 241–253, 370/254–271, 310–337, 338–350, 351–394, 370/395.1, 395.3, 395.4, 395.41, 395.42, 370/395.5, 395.52, 395.53, 412–421, 431–457, 370/458–463, 464–497, 498–522, 523–520, 370/521–529
See application file for complete search history.

(56) References Cited

U.S. PATENT DOCUMENTS

| | | | | |
|---|---|---|---|---|
| 7,039,005 B2 * | 5/2006 | Jenq et al. | | 370/217 |
| 7,237,035 B1 * | 6/2007 | Damle | | 709/236 |
| 7,451,340 B2 * | 11/2008 | Doshi et al. | | 714/47.2 |
| 7,545,736 B2 * | 6/2009 | Dziong et al. | | 370/217 |
| 7,606,237 B2 * | 10/2009 | Dziong et al. | | 370/395.41 |
| 7,652,983 B1 * | 1/2010 | Li et al. | | 370/217 |
| 7,689,693 B2 * | 3/2010 | Doshi et al. | | 709/226 |
| 7,774,493 B1 * | 8/2010 | Damle | | 709/236 |
| 7,978,596 B2 * | 7/2011 | Yamada et al. | | 370/217 |
| 2001/0033570 A1 * | 10/2001 | Makam et al. | | 370/373 |

(Continued)

FOREIGN PATENT DOCUMENTS

| | | |
|---|---|---|
| CN | 1466832 A | 1/2004 |
| CN | 1838606 A | 9/2006 |

(Continued)

OTHER PUBLICATIONS

International Search Report issued in corresponding PCT Application No. PCT/CN2008/073623; mailed Mar. 26, 2006.

(Continued)

*Primary Examiner* — Kwang B Yao
*Assistant Examiner* — Jung-Jen Liu
(74) *Attorney, Agent, or Firm* — Brinks Hofer Gilson & Lione

(57) ABSTRACT

A method and a network device for realizing shared mesh protection are provided. The method includes the following steps. If a status change of a working label switching path (LSP) is detected, routing information and bandwidth information about the working LSP are notified to every node on a protection LSP corresponding to the working LSP. Every node on the protection LSP calculates a maximal reserved bandwidth of a link based on the received routing information and bandwidth information and adjusts a shared protection bandwidth of the link according to the maximal reserved bandwidth.

7 Claims, 8 Drawing Sheets

U.S. PATENT DOCUMENTS

| | | | |
|---|---|---|---|
| 2003/0126287 A1 | 7/2003 | Charny et al. | |
| 2003/0161304 A1 | 8/2003 | Deboer et al. | |
| 2004/0109687 A1* | 6/2004 | Park et al. | 398/57 |
| 2004/0190445 A1* | 9/2004 | Dziong et al. | 370/225 |
| 2004/0193724 A1 | 9/2004 | Dziong et al. | |
| 2004/0193728 A1* | 9/2004 | Doshi et al. | 709/238 |
| 2004/0205237 A1* | 10/2004 | Doshi et al. | 709/241 |
| 2004/0205238 A1* | 10/2004 | Doshi et al. | 709/241 |
| 2004/0208118 A1 | 10/2004 | Deboer et al. | |
| 2006/0067210 A1 | 3/2006 | Liu et al. | |
| 2007/0280251 A1* | 12/2007 | Wang et al. | 370/395.1 |

FOREIGN PATENT DOCUMENTS

| | | |
|---|---|---|
| CN | 1866856 A | 11/2006 |
| CN | 1921409 A | 2/2007 |
| CN | 1941714 A | 4/2007 |

OTHER PUBLICATIONS

Office Action issued in corresponding Chinese Patent Application No. 200810002355.9, mailed Feb. 13, 2012.

Extended European Search Report issued in corresponding European Patent Application No. 08871589.1, mailed Jun. 9, 2010.

Written Opinion of the International Searching Authority issued in corresponding PCT Patent Application No. PCT/CN2008/073623, mailed Mar. 26, 2009.

Liu et al., "RSVP-TE Extension for Shared Mesh Protection" Internet Draft, Oct. 2002. XP-15004233A.

Liu et al., "RSVP-TE Extension for Shared Mesh Protection" Internet Draft, Oct. 2002.

Qureshi et al., "MPLS-TE Shared Mesh Protection" Internet Draft, Oct. 2002.

Sathyanath et al., "OSPF-TE Extensions for Shared Mesh Protection" Internet Draft, Oct. 2002.

ITU-T, "Protection Switching for MPLS Networks" Series Y: Global Information Infrastructure, Internet Protocol Aspects and Next-Generation Networks. International Telecommunications Union, Y.1720, Dec. 2006.

Telecommunication Standardization Sector, "Shared Mesh Protection in MPLS Networks" International Telecommunication Union, Study Group 13—Delayed Contribution 254. Geneva, Oct. 29-Nov. 8, 2002.

Office Action issued in corresponding Chinese Patent Application No. 200810002355.9, mailed Aug. 14, 2012.

* cited by examiner

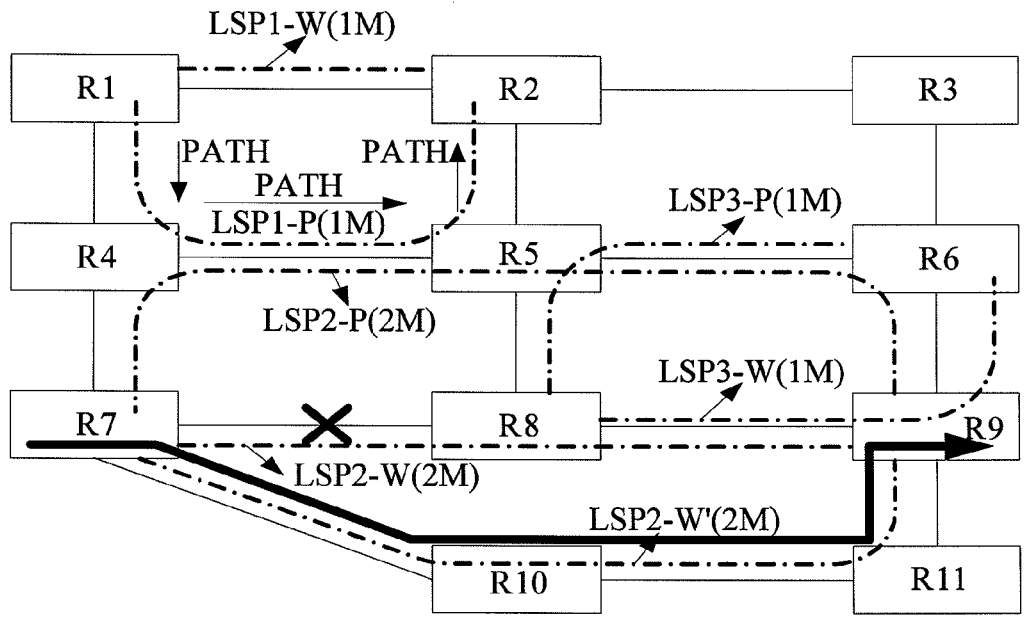

On a data plane, after detecting that a fault occurring to an LSP2-W is recovered through an OAM mechanism, node(s) R7 and/or R9 on the LSP2-W reports the recovery state of the fault to a control plane. — 1001

↓

The control plane switches services from an LSP2-W' to the LSP2-W and sets a protection relation that the LSP2-P protects the LSP2-W. — 1002

↓

The control plane is notified and removes the LSP2-W'. — 1003

FIG. 10

METHOD AND NETWORK DEVICE FOR REALIZING SHARED MESH PROTECTION

CROSS-REFERENCE TO RELATED APPLICATIONS

This application is a continuation of International Application No. PCT/CN2008/073623, filed on Dec. 19, 2008, which claims priorities to Chinese Patent Application No. 200710306902.8, filed on Dec. 27, 2007 and Chinese Patent Application No. 200810002355.9, filed on Jan. 15, 2008, all of which are hereby incorporated by reference in their entireties.

FIELD OF THE TECHNOLOGY

The present disclosure relates to the field of network protection switching technology, and particularly to a method and a network device for realizing shared mesh protection.

BACKGROUND OF THE DISCLOSURE

Network protection is an important characteristic of a telecommunication network. In order to realize the protection, a protection path, not joint (i.e., distinct from) with a working path, is usually established in advance. When a fault occurs to the working path, a working flow is switched from the working path to the protection path. Generally, a protection label switching path (LSP) is established with an exclusive bandwidth for each working LSP for protection. In this way, the protection bandwidth that needs to be reserved on a link is the sum of all the protection LSP bandwidths passing through the link so a large amount of bandwidth will be reserved and cannot be used for other services.

In fact, in most cases, a probability of multiple faults occurring at the same time is quite low. Therefore, shared mesh protection proposed subsequently is a method for realizing bandwidth sharing of a plurality of protection paths in the case of a single-point fault. The shared mesh protection is a type of end-to-end protection with the protection paths and resources allocated in advance. Thereby, shared mesh protection can achieve the protection switching speed of linear protection switching, and the switching speed is much faster than that of recovery protection which is typically used in current automatic switching optical networks (ASONs).

FIG. 1 is a specific example in which shared mesh protection technology in the prior art is applied. A network is constituted by nodes N1 to N6 and links between the nodes including five working LSPs (LSP1 to LSP5) and five corresponding protection LSPs (LSP6 to LSP10) and each of the LSPs is shown in FIG. 1. Table 1 is a database for calculating bandwidth reservation information for each link in the example which maintains bandwidths amount of the services need to be switched to another link when a fault occurs to one link in the network. If the switching succeeds, the link that is switched to is also required to reserve at least corresponding protection bandwidth. For example, the number "1" in the second row and fifth column indicates that 1 M service traffic is switched from a link L4 to a link L1 when a fault occurs to the link L4. For each link, only a maximal value of the bandwidth of the services switched during a fault of the link needs to be reserved to ensure that the link is able to carry the switched services completely in the case of a fault at any position.

TABLE 1

| Link | L-1 | L-2 | L-3 | L-4 | L-5 | L-6 | L-7 | N1 | N2 | N3 | N4 | N5 | N6 | Maximal Reserved Bandwidth |
|---|---|---|---|---|---|---|---|---|---|---|---|---|---|---|
| L-1 | | | 1 | 1 | | 1 | | | | | | 1 | | 1 |
| L-2 | | | 1 | 1 | | 1 | | | | | | 1 | | 1 |
| L-3 | 1 | 1 | | 1 | | | | | 1 | | | | | 1 |
| L-4 | 1 | 1 | | | 1 | | | 1 | 1 | 1 | | | | 1 |
| L-5 | | | 1 | | | 1 | | | | | | 1 | | 1 |
| L-6 | | | | 1 | 2 | | | 1 | | 1 | 1 | | | 2 |
| L-7 | | | 1 | 1 | 1 | 1 | | | | 1 | | 1 | | 1 |

In the prior art, a centralized control method is employed to calculate a reserved bandwidth. In a first method of the prior art, a centralized controller calculates routing and bandwidth information in the whole network and maintains entries similar to those in Table 1. When a protection path is computed, a protection bandwidth of each link on the protection LSP is obtained according to the entries. When a protection path is established, bandwidth information about each link is carried thereon. Therefore, nodes on the protection path are enabled to perform bandwidth reservation based on the information.

In a second method of the prior art, when a protection path is established, by carrying explicit routing information about a working path, each node maintains an entry similar to that in Table 1 according to the explicit routing information about the working path. However, the node just maintains the protection bandwidth information needed for links on the node itself. Each node determines required protection bandwidth for the links on the node itself according to the entry maintained by the node itself.

However, the first and second methods of the prior art only support the protection switching for a single fault. If a second fault occurs before a first fault is recovered (i.e., as available bandwidth information on the protection LSP has been changed after the first fault switching and the system lacks in managing and maintaining the shared protection bandwidth of the protection LSP), the second fault switching may fail and service protection may not be realized. In addition, in the first method of the prior art, the centralized controller further needs to maintain a large amount of information and requirements for the centralized controller are very high.

For follow-up protection after one fault, a simple approach is to recompute the shared protection path of the affected LSP and redeploy new protection paths. However, in such an approach, many LSPs are affected and the implementation is quite complicated as a large number of LSPs need to be removed and reestablished.

SUMMARY OF THE DISCLOSURE

Accordingly, the present disclosure is directed to a method and a network device for realizing shared mesh protection in order to realize dynamic management and maintenance of a shared protection bandwidth.

An embodiment of the present disclosure provides a method for realizing shared mesh protection which includes the following steps described below.

When detecting a status change of a working label switching path (LSP), routing information and bandwidth information about the working LSP are notified to each node on a protection LSP corresponding to the working LSP. Each node on the protection LSP calculates a maximal reserved bandwidth of a link based on the routing information and the bandwidth information and adjusts a shared protection bandwidth of the link according to the maximal reserved bandwidth.

An embodiment of the present disclosure further provides a method for realizing shared mesh protection which includes the following steps described below.

Detect a fault on a working LSP, switch the services on the working LSP to a protection LSP, establish a new working LSP, switch the services on the protection LSP to the new working LSP, and set a protection relationship is that the protection LSP protects the new working LSP. Before the services on the protection LSP are switched to the new working LSP, the method further includes configuring the new working LSP to protect the protection LSP. After the services on the protection LSP are switched to the new working LSP, if fault recovery is detected, switch the services on the new working LSP to the working LSP, set that the protection LSP protects the working LSP, and remove the new working LSP.

An embodiment of the present disclosure further provides a network device for realizing shared mesh protection which includes a service switching module, a signaling receiving module, and a maintaining module.

The service switching module is adapted to determine that a status change occurs to a working LSP and switch services from the working LSP to a protection LSP or switch services from the protection LSP to the working LSP.

The signaling receiving module is adapted to receive a signaling message carrying routing information and bandwidth information about the working LSP.

The maintaining module is adapted to adjust a shared protection bandwidth on a link of the protection LSP related to the switching performed by the service switching module based on the routing information and the bandwidth information in the signaling message received by the signaling receiving module.

An embodiment of the present disclosure further provides a network device for realizing shared mesh protection which includes a service switching module and an LSP establishing module.

The service switching module is adapted to switch services from a working LSP to a protection LSP when a fault occurs to the working LSP.

The LSP establishing module is adapted to establish a new working LSP when the services are switched from the working LSP to the protection LSP.

The service switching module is also adapted to switch the services from the protection LSP to the new working LSP.

The service switching module is further adapted to switch the services from the new working LSP to the working LSP when the fault of the working LSP gets recovery.

The network device further includes an LSP removal module which is adapted to remove the new working LSP when the services are switched from the new working LSP back to the working LSP.

Compared with the prior art, in the embodiments of the present disclosure, by adjusting the shared protection bandwidth after protection switching or using the protection LSP as a transition and establishing a new LSP for protection switching, dynamic management and maintenance of the shared protection bandwidth of the protection LSP can be realized so that a fault at any position can still be flexibly protected after at least one fault occurs in case of shared mesh protection. The solution is simple and easy for implementation and is capable of effectively increasing the bandwidth resource utilization and service survivability.

BRIEF DESCRIPTION OF THE DRAWINGS

FIG. 9 is a schematic view of switching services to the path LSP2-W' in the process as shown in FIG. 7;

FIG. 10 is a flow chart of processing of fault recovery after protection switching according to the second embodiment of the present disclosure.

DETAILED DESCRIPTION OF THE EMBODIMENTS

In order to make the objectives, technical solutions, and advantages of the present disclosure more comprehensible, technical solutions according to the embodiments of the present disclosure are illustrated in detail below with specific examples.

Figure 1:
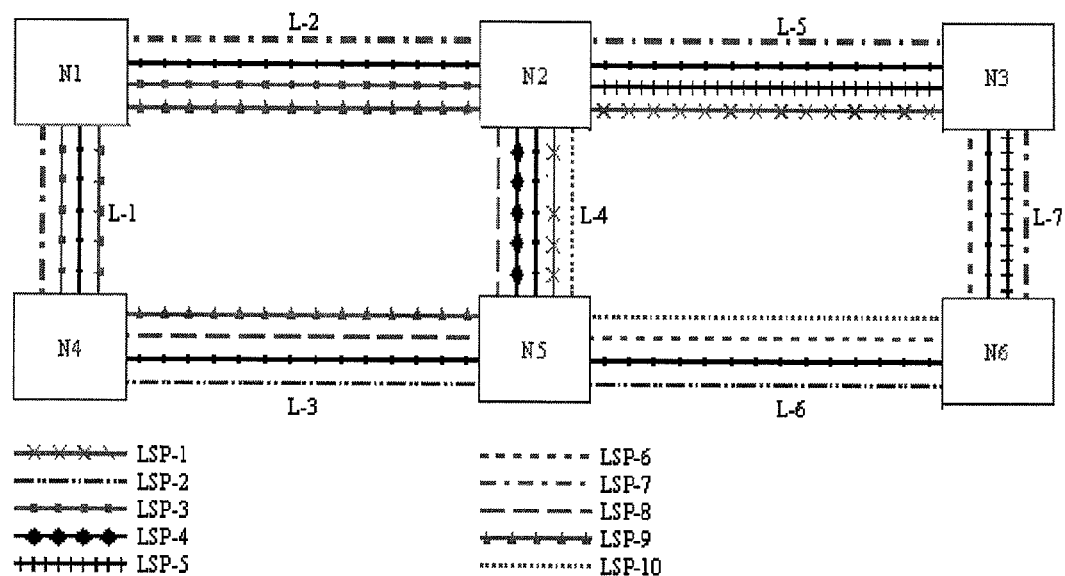
FIG. 1 is a specific example in which shared mesh protection technology in the prior art is applied.
Figure 2:
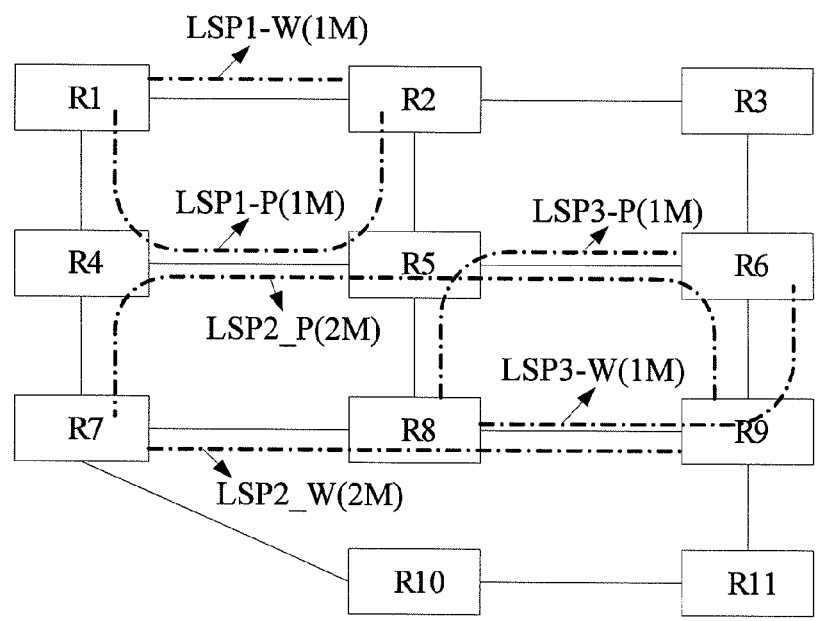
FIG. 2 is a schematic view of each LSP in an example of a mesh network in a solution according to an embodiment of the present disclosure.

FIG. 2 shows a state of each LSP in a mesh network which includes three working LSPs, namely, LSP1-W, LSP2-W, and LSP3-W, as well as three corresponding protection LSPs, namely, LSP1-P, LSP2-P, and LSP3-P. A bandwidth of the LSP2 is 2 Megabit (Mbit), referenced herein simply as "M", and bandwidths of the LSP1 and the LSP3 are each respectively 1 M. A node R5 maintains an entry for calculating protection bandwidth reservation information related to the node as shown in Table 2. In the following, the entry is referred to as a fault influence table. The fault influence table includes service bandwidths that each link connected to the node reserves for other links as well as a maximal reserved bandwidth and a current shared protection bandwidth of each link connected to the node, all at a unit of megabit.

TABLE 2

| Link | R1-R2 | R7-R8 | R8-R9 | R9-R6 | R6-R3 | R8 | R9 | R6 | Maximal Reserved Bandwidth | Shared Protection Bandwidth |
|---|---|---|---|---|---|---|---|---|---|---|
| R2-R5 | 1 |   | 1 | 1 | 1 |   | 1 | 1 | 1 | 1 |
| R4-R5 | 1 | 2 | 2 |   |   | 2 |   |   | 2 | 2 |
| R8-R5 |   |   | 1 | 1 | 1 |   | 1 | 1 | 1 | 1 |
| R6-R5 |   | 2 | 3 |   |   | 2 |   |   | 3 | 3 |

The reserved service bandwidth is the required bandwidth when switching services to a link B in case of a fault occurs to a link A which is protected by the link B. As shown in Table 2, the service bandwidth required to be reserved on the link R6-R5 for protecting the link R8-R9 is 3 M, and the service bandwidth required to be reserved on the link R6-R5 for protecting the link R7-R8 is 2 M. The maximal reserved bandwidth means a maximal reserved service bandwidth in all reserved service bandwidths of the link B. The link only needs to satisfy the maximal reserved service bandwidth to protect all links that need protection due to the principle of shared mesh protection. According to Table 2, in order to realize the protection, a maximal reserved bandwidth of the node R5 on the link R6-R5 is 3 M, a maximal reserved bandwidth on the link R4-R5 is 2 M, and a maximal reserved bandwidth on the link R8-R5 and the link R2-R5 is respectively 1 M. The shared protection bandwidth means a current actually idle bandwidth on the link B and the idle bandwidth can serve as a bandwidth for protecting other links. The shared protection bandwidth only needs to be set not less than (i.e., greater than or equal to) the maximal reserved bandwidth. For saving network resources, the shared protection bandwidth is usually set equal to the maximal reserved bandwidth.

Connection monitoring is performed on both working LSPs and protection LSPs to determine whether a fault occurs to the LSPs. A specific manner of the connection monitoring depends on the property of the LSP. For example, if the LSP is of a provider backbone bridge-traffic engineering (PBB-TE) connection, a continuity check (CC) mechanism defined in Ethernet operation, administration, and maintenance (OAM) is employed for connection monitoring. If the LSP is a multi-protocol label switch (MPLS) LSP, an MPLS connectivity verification (CV) mechanism defined in MPLS OAM is employed for connection monitoring. If the LSP is a transport MPLS (T-MPLS) LSP, a CC mechanism defined in T-MPLS OAM is employed for connection monitoring.

The present disclosure provides a method for realizing shared mesh protection which includes the following steps described herein. If a status change of a working LSP is detected, routing information and bandwidth information about the working LSP are notified to every node on a protection LSP corresponding to the working LSP. Every node on the protection LSP calculates a maximal reserved bandwidth of a link based on the received routing information and bandwidth information and adjusts a shared protection bandwidth of the link according to the maximal reserved bandwidth. According to the status change of the path, dynamic management and maintenance of the bandwidth can be realized so as to effectively protect against subsequent possible faults after a fault occurs to the shared mesh protection.

Embodiment 1

When a fault occurs to a working LSP and protection switching is performed, a reserved service bandwidth corresponding to the working LSP is occupied in a shared protection bandwidth on a link of a protection LSP corresponding to the working LSP. Thereby, in the first embodiment, the present disclosure provides a technical solution to protect against subsequent faults by dynamically increasing the shared protection bandwidth of the protection LSP.

Figure 3:
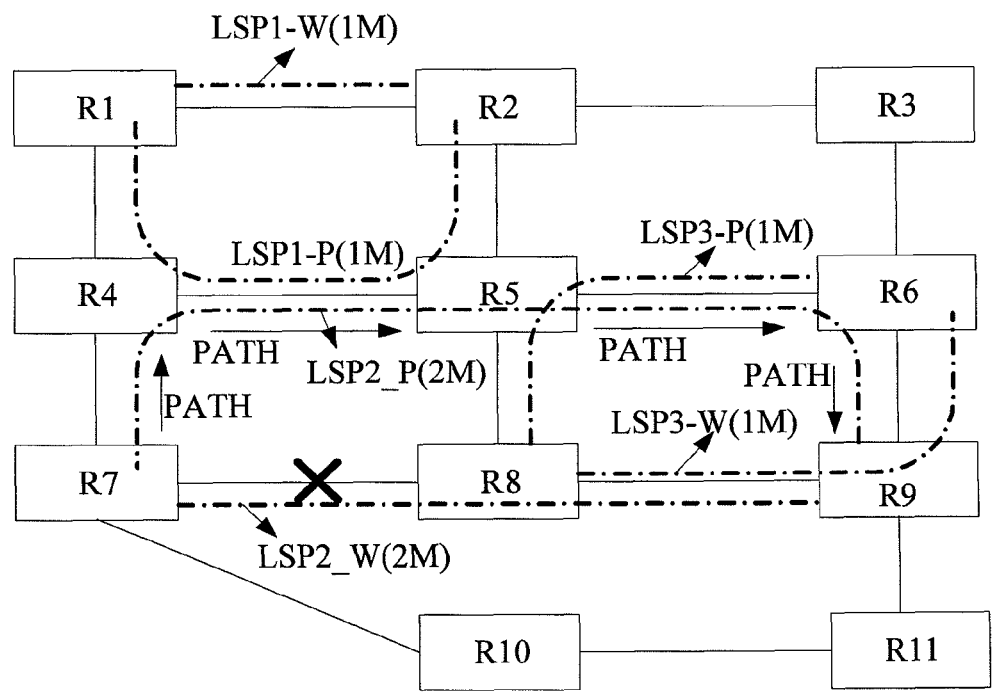
FIG. 3 is a schematic view of a situation when a fault occurs in a link R7-R8 in the network as shown in FIG. 2.
Figure 4:
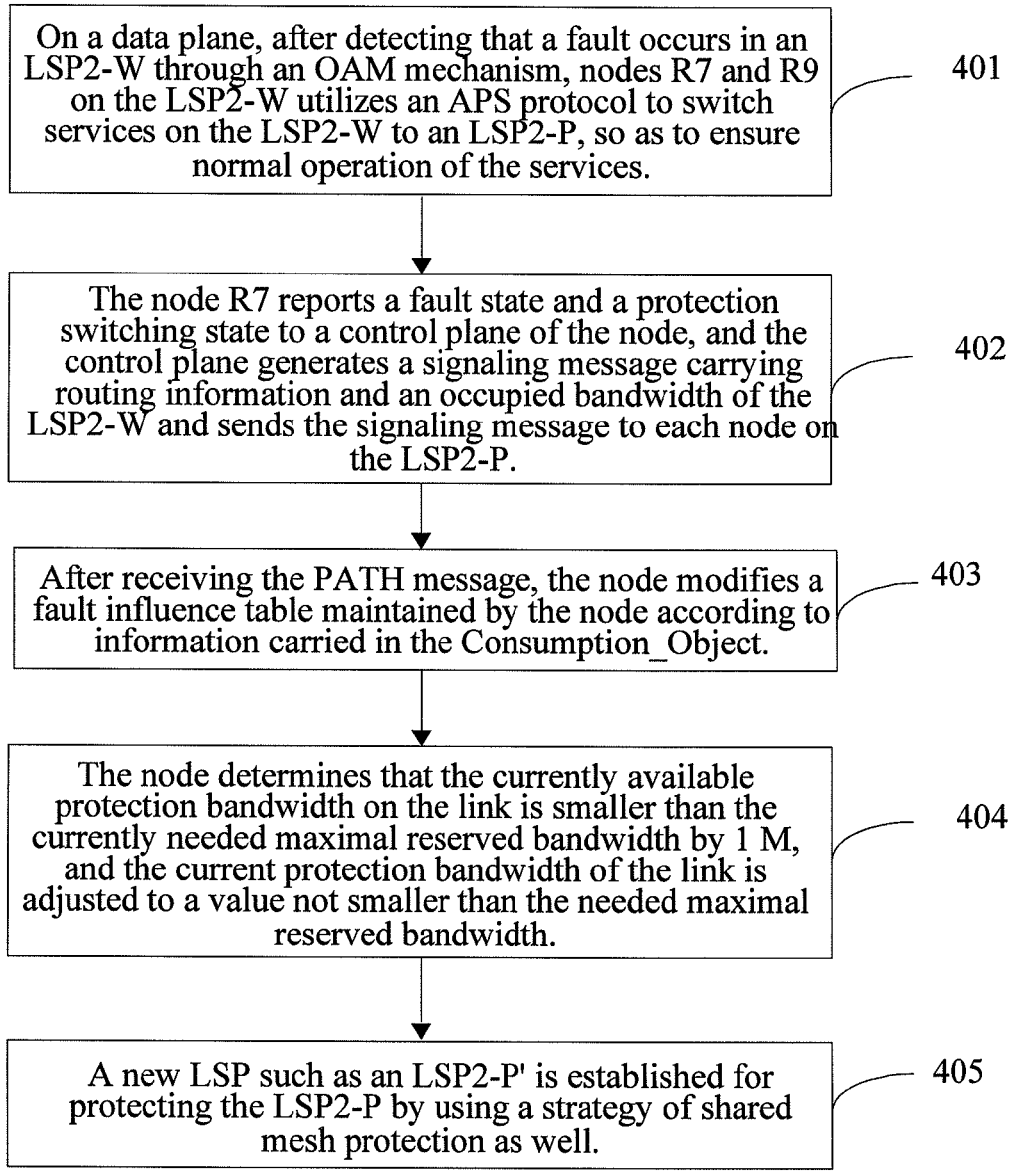
FIG. 4 is a flow chart of protection switching according to a first embodiment of the present disclosure.

For example, it is assumed that a fault occurs to link R7-R8 in the network of FIG. 2, as shown in FIG. 3. According to the solution of the first embodiment, a protection switching process implemented after the fault occurs is shown in FIG. 4, which includes the following steps described below.

In step 401, on a data plane, after node(s) R7 and/or R9 detect that a fault occurs to an LSP2-W through an OAM mechanism, nodes R7 and R9 switch services on LSP2-W to LSP2-P by an automatic protection switching (APS) protocol, so as to ensure normal operation of the services.

In step 402, the node R7 reports a fault state and a protection switching state to a control plane of the node (for example, a control protocol state machine on the node R7), and the control plane generates a signaling message to notify each node (e.g., nodes R7, R4, R5, R6, and R9) on the protection path LSP2-P that "the LSP2-W is switched to the LSP2-P, and 2 M shared protection bandwidths of the LSP2-P is occupied". The signaling message may be, for example, a PATH message as illustrated below. To achieve this objective, the signaling message transferred on the protection path LSP2-P needs to carry routing information and bandwidth information about the LSP2-W which is realized by extending the PATH message to carry new objects. In this embodiment, a Consumption_Object including two sub-objects, namely, a Bandwidth sub-object and an LSP_ERO sub-object, is extended in the PATH message. The Bandwidth sub-object indicates an amount of bandwidth occupied by the protected working path LSP2-W (2 M herein). The LSP_ERO sub-object indicates explicit routing information about the protected working path LSP2-W. In this example, an explicit route of the LSP2-W is {R7, R8, R9}.

In step 403, after receiving the PATH message, the node on the protection path LSP2-P modifies a fault influence table maintained by the node according to information carried in the Consumption_Object. The modification is implemented as described herein. A bandwidth amount carried in the Bandwidth sub-object is subtracted from the reserved service bandwidths and shared protection bandwidths of entries corresponding to links and nodes related in the LSP_ERO sub-object carried in the Consumption_Object respectively to obtain a current reserved service bandwidth and a current shared protection bandwidth of a corresponding entry and a needed maximal reserved bandwidth is recalculated according to the current reserved service bandwidth. Table 3 shows a modified state of the fault influence table by the node R5. Other nodes on the LSP2-P also perform modifications similar to R5 on respective fault influence tables.

TABLE 3

| Link  | R1-R2 | R7-R8 | R8-R9 | R9-R6 | R6-R3 | R8  | R9 | R6 | Maximal Reserved Bandwidth | Shared Protection Bandwidth |
|-------|-------|-------|-------|-------|-------|-----|----|----|----------------------------|-----------------------------|
| R2-R5 | 1     |       | 1     | 1     | 1     |     | 1  | 1  | 1                          | 1                           |
| R4-R5 | 1     | 2→0   | 2→0   |       |       | 2→0 |    |    | 2→1                        | 2→0                         |
| R8-R5 |       |       | 1     | 1     | 1     |     | 1  | 1  | 1                          | 1                           |
| R6-R5 |       | 2→0   | 3→1   |       |       | 2→0 |    |    | 3→1                        | 3→1                         |

In step 404, the node R5 determines that the current shared protection bandwidth on the link R4-R5 is smaller than the currently needed maximal reserved bandwidth by 1 M according to the modified fault influence table, and the shared protection bandwidth of the link R4-R5 is adjusted to be equal to the needed maximal reserved bandwidth. That is, the shared protection bandwidth is increased by 1 M to satisfy a protection demand. The adjustment of the fault influence table by the node R5 is shown in Table 4. Other nodes on the protection path LSP2-P also perform similar adjustment.

TABLE 4

| Link  | R1-R2 | R7-R8 | R8-R9 | R9-R6 | R6-R3 | R8 | R9 | R6 | Maximal Reserved Bandwidth | Shared Protection Bandwidth |
|-------|-------|-------|-------|-------|-------|----|----|----|----------------------------|-----------------------------|
| R2-R5 | 1     |       | 1     | 1     | 1     |    | 1  | 1  | 1                          | 1                           |
| R4-R5 | 1     | 0     | 0     |       |       | 0  |    |    | 1                          | 0→1                         |
| R8-R5 |       |       | 1     | 1     | 1     |    | 1  | 1  | 1                          | 1                           |
| R6-R5 |       | 0     | 1     |       |       | 0  |    |    | 1                          | 1                           |

Figure 5:
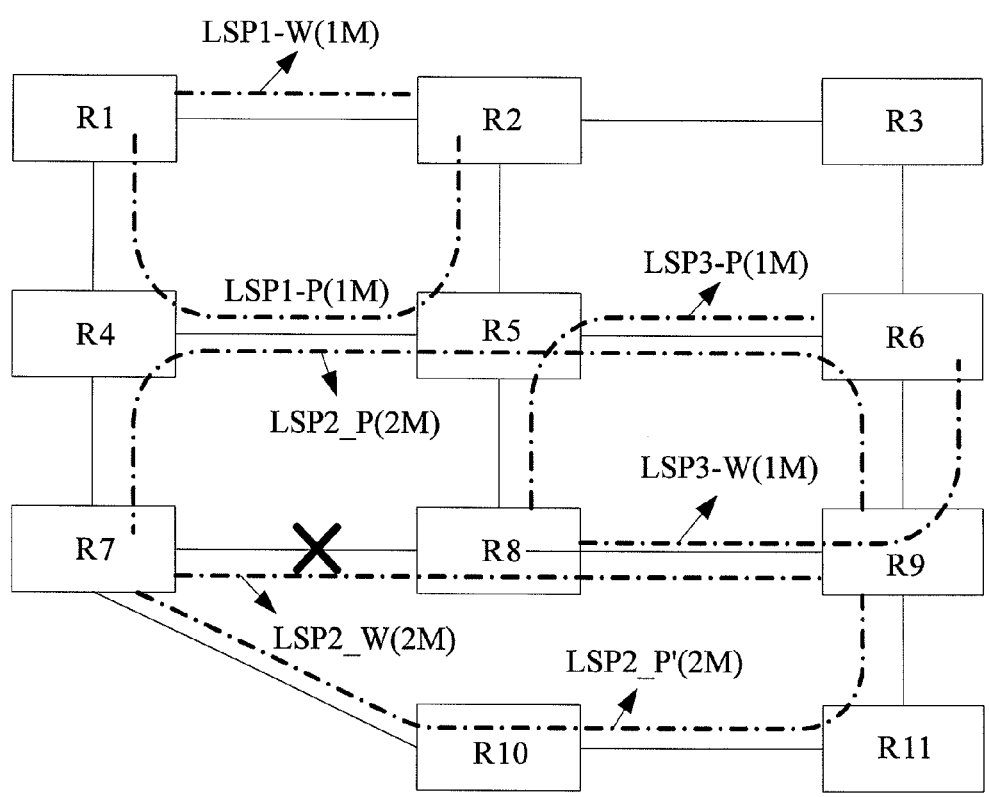
FIG. 5 is a schematic view of establishing a path LSP2-P' in the process as shown in FIG. 4.

In step 405, as traffic switched to the protection LSP lacks of protection, a new LSP such as an LSP2-P' could be established for protecting the LSP2-P by using a strategy of shared mesh protection as well. As shown in FIG. 5, a path LSP2-P' is established for protecting the LSP2-P and a corresponding protection relation is reset through a control plane. Step 405 is optional.

Through the process in FIG. 4, protection switching is performed against the fault of the R7-R8. Moreover, the shared protection bandwidth in the fault influence table maintained on the node is adjusted. If subsequently a fault again occurs to a link, the node may still perform protection switching successfully.

Embodiment 2

After a working LSP is recovered from a fault state to a normal state, services need to be switched from a protection LSP back to the working LSP. A part of a reserved service bandwidth occupied in a link corresponding to the protection LSP is again recovered to a part of a shared protection bandwidth. In the second embodiment, the present disclosure provides a technical solution to protect against subsequent faults by dynamically adjusting the shared protection bandwidth of the protection LSP.

Figure 6:
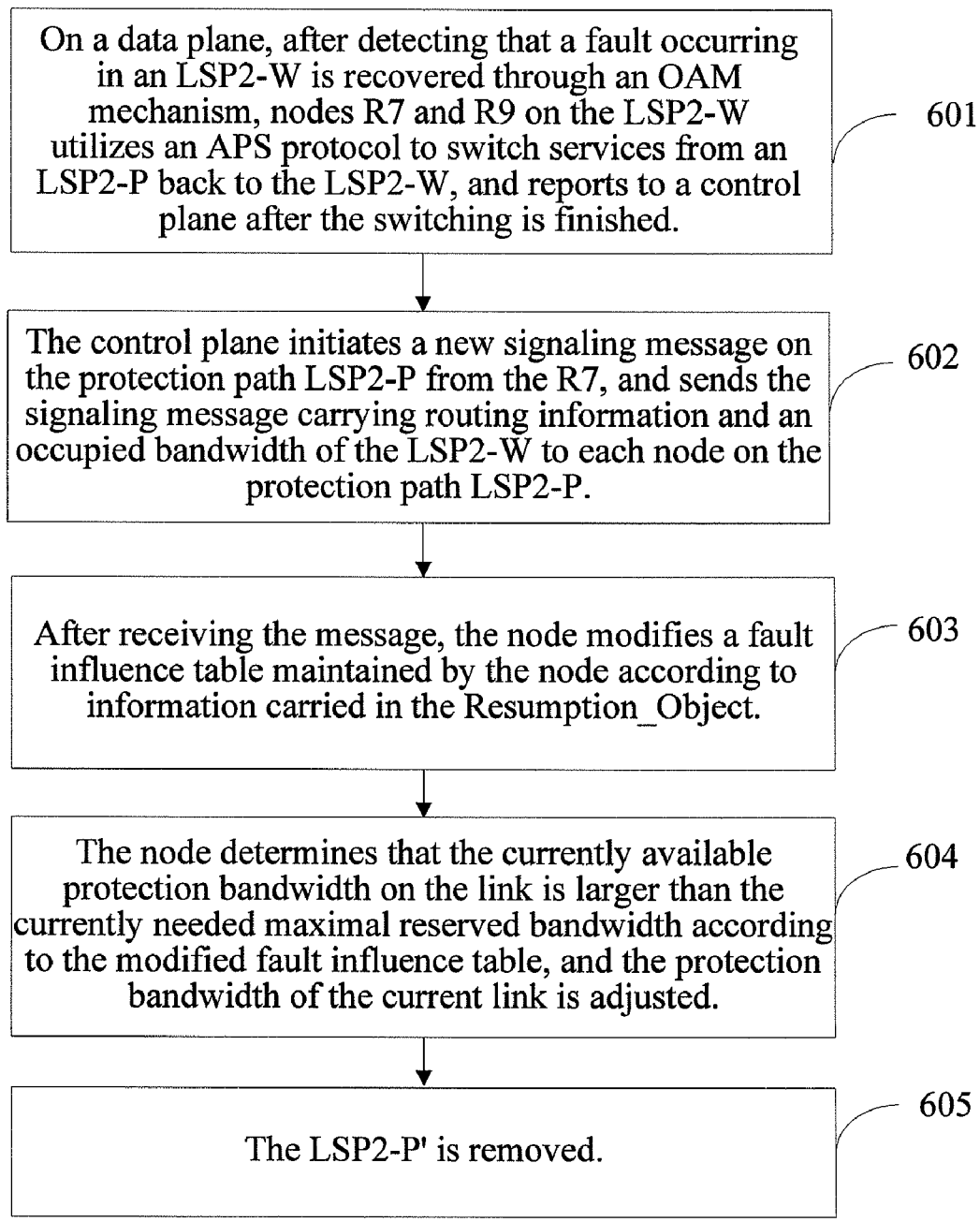
FIG. 6 is a flow chart of the process in case of fault recovery after protection switching according to the first embodiment of the present disclosure.

Specifically, after the protection switching, if the fault in the R7-R8 in FIG. 2 is recovered, the process in FIG. 6 is performed which includes the following steps described below.

In step 601, on a data plane, after node(s) R7 and/or R9 detect that a fault occurring to an LSP2-W is recovered through an OAM mechanism, nodes R7 and R9 utilize an APS protocol to switch services from an LSP2-P back to the LSP2-W. After the switching is finished, reports are submitted to the control plane.

In step 602, the control plane initiates a new signaling message on the protection path LSP2-P from the R7 (a PATH message is still utilized as an example herein) so as to notify each node (e.g., nodes R7, R4, R5, R6, and R9) on the protection path LSP2-P that "the services are switched from the LSP2-P back to the LSP2-W, and a 2 M bandwidth is released to serve as a part of the shared protection bandwidth". To achieve this objective, the signaling message transferred on the protection path LSP2-P needs to carry routing information and bandwidth information about the LSP2-W which is realized by extending the PATH message to carry new objects. In this embodiment, a Resumption_Object including two sub-objects, namely, a Bandwidth sub-object and an LSP_ERO sub-object, is extended in the PATH message. The Bandwidth sub-object indicates an amount of occupied bandwidth (2 M herein). The LSP_ERO sub-object indicates explicit routing information about the protected LSP. In this example, an explicit route of the LSP2-W is {R7, R8, R9}.

In step 603, after receiving the PATH message, the node modifies a fault influence table maintained by the node according to information carried in the Resumption_Object. The modification is implemented as follows. A bandwidth amount carried in the Bandwidth sub-object is added to the reserved service bandwidths and shared protection bandwidths of entries corresponding to links and nodes related in the LSP_ERO sub-object carried in the Resumption_Object respectively to obtain a current reserved service bandwidth and a current shared protection bandwidth of a corresponding entry, and a maximal reserved bandwidth is recalculated according to the modified reserved service bandwidth. Table 5 shows a modified state of the fault influence table by the node R5.

TABLE 5

| Link | R1-R2 | R7-R8 | R8-R9 | R9-R6 | R6-R3 | R8 | R9 | R6 | Maximal Reserved Bandwidth | Shared Protection Bandwidth |
|---|---|---|---|---|---|---|---|---|---|---|
| R2-R5 | 1 |  | 1 | 1 | 1 |  | 1 | 1 | 1 | 1 |
| R4-R5 | 1 | 0→2 | 0→2 |  |  | 0→2 |  |  | 1→2 | 1→3 |
| R8-R5 |  |  | 1 | 1 | 1 |  | 1 | 1 | 1 | 1 |
| R6-R5 |  | 0→2 | 1→3 |  |  | 0→2 |  |  | 1→3 | 1→3 |

In step 604, the node R5 determines that the current shared protection bandwidth on the link R4-R5 is larger than the currently needed maximal reserved bandwidth by 1 M according to the modified fault influence table, and the shared protection bandwidth of the link R4-R5 is adjusted to be reduced by 1 M. Table 6 shows an adjusted state of the fault influence table by the node R5.

TABLE 6

| Link | R1-R2 | R7-R8 | R8-R9 | R9-R6 | R6-R3 | R8 | R9 | R6 | Maximal Reserved Bandwidth | Shared Protection Bandwidth |
|---|---|---|---|---|---|---|---|---|---|---|
| R2-R5 | 1 |  | 1 | 1 | 1 |  | 1 | 1 | 1 | 1 |
| R4-R5 | 1 | 2 | 2 |  |  | 2 |  |  | 2 | 3→2 |
| R8-R5 |  |  | 1 | 1 | 1 |  | 1 | 1 | 1 | 1 |
| R6-R5 |  | 2 | 3 |  |  | 2 |  |  | 3 | 3 |

If a path LSP2-P' is established in advance for protecting the LSP2-P, the method further includes the following step.

In step 605, the LSP2-P' is removed.

Embodiment 3

In the solution provided by the third embodiment of the present disclosure, a current protection path serves as an intermediate transition. When a fault occurs, services are first switched to the current protection path and a new working path is established. Then, the services are switched to the new working path, and the previous protection path is adapted to protect the new working path.

Figure 7:
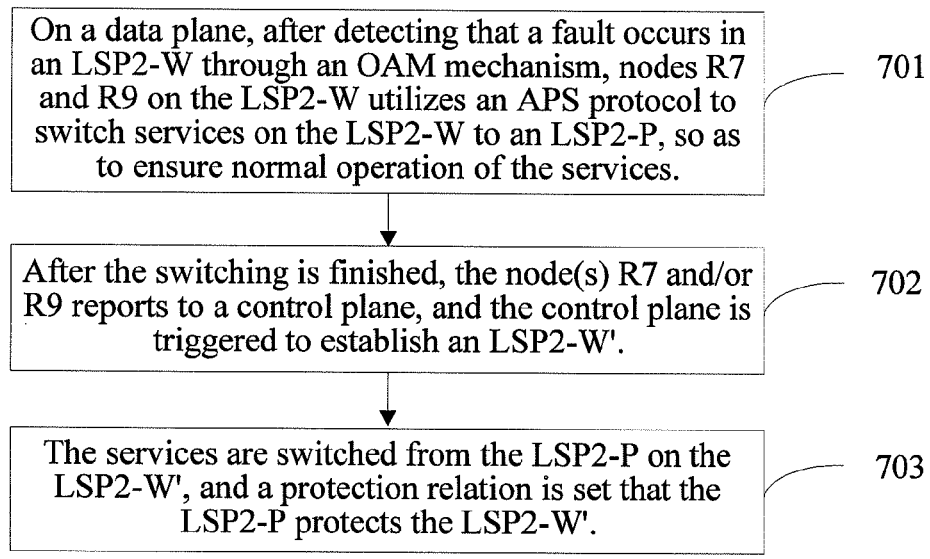
FIG. 7 is a flow chart of protection switching according to a second embodiment of the present disclosure.

It is still assumed that a fault occurs to the link R7-R8 in the network shown in FIG. 2, and the protection switching process in the solution according to the third embodiment is implemented as shown in FIG. 7, which includes the following steps.

In step 701, on a data plane, after node(s) R7 and/or R9 detect that a fault occurs to an LSP2-W through an OAM mechanism, nodes R7 and R9 on the LSP2-W utilize an APS protocol to switch services on the LSP2-W to an LSP2-P, so as to ensure normal operation of the services.

Figure 8:
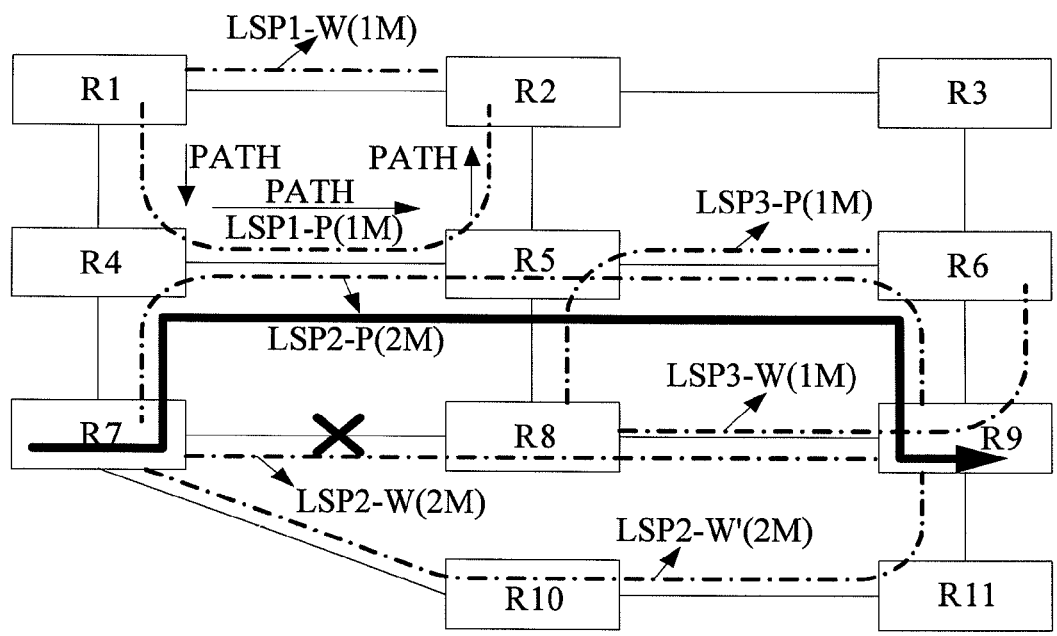
FIG. 8 is a schematic view of establishing a path LSP2-W' in the process as shown in FIG. 7.

In step 702, after the switching is finished, the node(s) R7 and/or R9 report to a control plane. The control plane is triggered to establish an LSP2-W', for example, R7-R10-R11-R9 with an exclusive bandwidth as shown in FIG. 8. Referring to FIG. 8, a thick arrow indicates a service path. The PATH message of an RSVP-TE is utilized to establish a path. Path computation is accomplished with a path computation element (PCE).

In step 703, the services are switched from the LSP2-P to the LSP2-W'. As shown in FIG. 9, a protection relation is set that the LSP2-P protects the LSP2-W'.

Before switching, the protection relation may be configured so that the LSP2-W' protects the LSP2-P. During switching, forced switching in the APS protocol may be adopted to realize lossless switching of services. After the switching is finished, the protection relation is configured so that the LSP2-P protects the LSP2-W'. If a new fault occurs to the LSP2-W' before the fault of the link R7-R8 is recovered and after the switching, a process similar to the foregoing process may be performed for protection switching.

If the fault of the link R7-R8 is recovered after the protection switching, the process shown in FIG. 10 is performed, which includes the following steps.

In step 1001, on a data plane, after detecting that a fault occurring to an LSP2-W is recovered through an OAM mechanism, node(s) R7 and/or R9 on the LSP2-W report the recovery state of the fault to a control plane.

Figure 11:
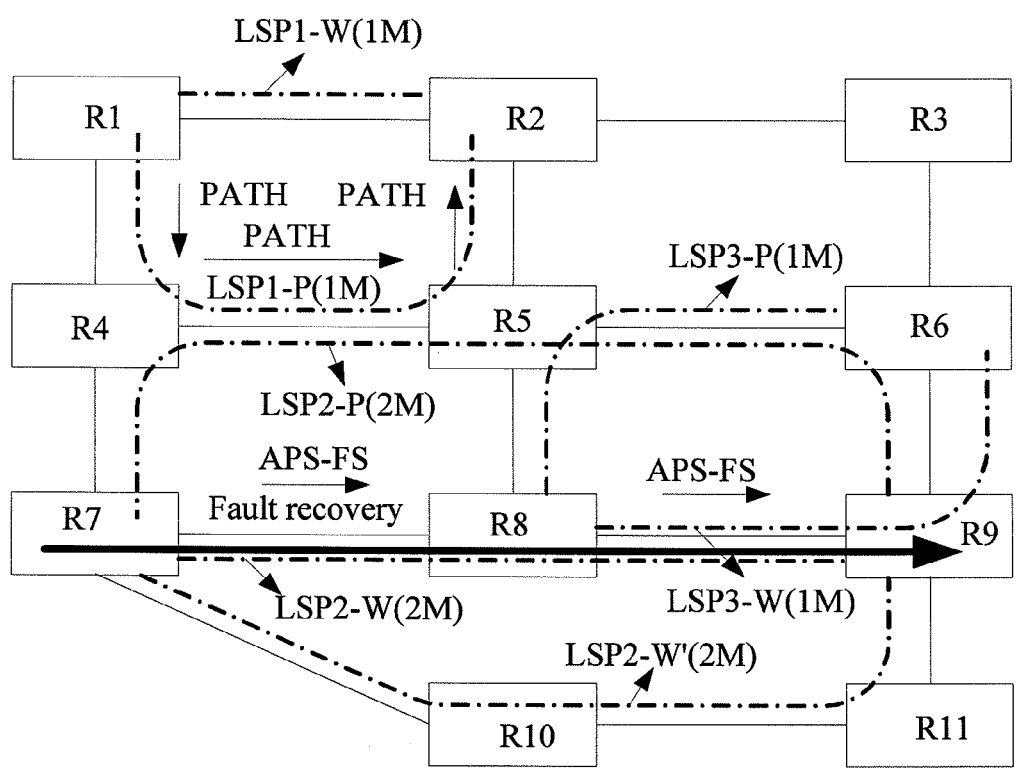
FIG. 11 is a schematic view of switching services to a working path LSP2-W in the process as shown in FIG. 10.

In step 1002, the control plane switches services from an LSP2-W' to the LSP2-W, as shown in FIG. 11, and sets a protection relation that the LSP2-P protects the LSP2-W.

Specifically, the above step may be implemented in the following manner. An RSVP-TE signaling is first adopted to change the protection relation to that the LSP2-W protects the LSP2-W'. A forced switching command of an APS is then triggered and the services are switched from the LSP2-W' to the LSP2-W. The control plane is notified that the switching is finished. The control plane triggers the RSVP-TE signaling to change the protection relation so that the LSP2-P protects the LSP2-W.

In step 1003, a control plane is notified. The control plane removes the LSP2-W'. The removal may be accomplished by an RESV-TE PathTear signaling.

According to the method of the first embodiment, if it is determined that the rest bandwidth of a link on the protection LSP is insufficient to satisfy the demand of the shared protection bandwidth after the nodes on the protection LSP receive the routing information and bandwidth information about the working LSP, an error message is generated, which may be an RSVP-TE resource error (ResvErr) or path error (PathErr) message, and the message is sent to a node initiating the signaling. The error message carries notification information that "the needed bandwidth cannot be added to the node". After the node receives the error message, the protection switching process described in the third embodiment is utilized.

Embodiment 4

In the fourth embodiment, the present disclosure provides a network device for realizing shared mesh protection, which includes a service switching module, a signaling receiving module, a fault influence information module, and a maintaining module.

The service switching module is adapted to determine that a status change occurs to a working LSP and to switch services from the working LSP to a protection LSP or to switch services from the protection LSP to the working LSP. Specifically, the service switching module is adapted to switch services from the working LSP to the protection LSP when a fault occurs to the working LSP and to switch the services from the protection LSP to the working LSP when the working LSP is recovered.

The signaling receiving module is adapted to receive a signaling message carrying routing information and bandwidth information about the working LSP.

The fault influence information module is adapted to save a fault influence table of protection bandwidth reservation information related to the network device. The fault influence table includes service bandwidths that each link connected to the network device reserves for other links as well as a maximal reserved bandwidth and a shared protection bandwidth of each link connected to the node.

The maintaining module is adapted to modify a reserved service bandwidth and a maximal reserved bandwidth of a link of an entry corresponding to the fault influence table maintained in the fault influence information module based on the routing information and bandwidth information in the signaling message received by the signaling receiving module and to adjust the shared protection bandwidth of the link according to the modified maximal reserved bandwidth.

In some cases, the rest bandwidth of a link may not satisfy the demand of the adjusted shared protection bandwidth, and the maintaining module fails to work normally. In order to detect such a situation in a timely fashion, the network device further includes an alarming module.

The alarming module is adapted to send an error message when the maintaining module discovers that the rest bandwidth of the link is unable to satisfy demand of the shared protection bandwidth.

When the above situation occurs, the adjustment after protection switching may not be performed by modifying the shared protection bandwidth, and a new working LSP is established to enable a ring network after protection switching to realize protection switching for subsequent faults. The network device further includes an LSP establishing module.

The LSP establishing module is adapted to establish a new working LSP when the services are switched from the working LSP to the protection LSP and the signaling receiving module receives the error message from the network device on the protection LSP.

The service switching module is also adapted to switch the services from the protection LSP to the new working LSP.

The service switching module is further adapted to switch the services from the new working LSP back to the original working LSP when the fault of the working LSP is recovered.

Optionally, the network device may further include an LSP removing module.

The LSP removing module is adapted to remove the new working LSP when the services are switched from the new working LSP back to the original working LSP.

The LSP establishing module is further adapted to establish an LSP for protecting the protection LSP when the services are switched from the working LSP to the protection LSP.

The LSP removing module is further adapted to remove the LSP for protecting the protection LSP established by the LSP establishing module when the services are switched from the protection LSP to the working LSP.

Embodiment 5

In the fifth embodiment, the present disclosure further provides another network device for realizing shared mesh protection which includes a service switching module and an LSP establishing module.

The service switching module is adapted to switch services from a working LSP to a protection LSP when a fault occurs to the working LSP.

The LSP establishing module is adapted to establish a new working LSP when the services are switched from the working LSP to the protection LSP.

The service switching module is further adapted to switch the services from the protection LSP to the new working LSP.

The service switching module is further adapted to switch the services from the new working LSP back to the original working LSP when the fault of the working LSP is recovered.

Optionally, the network device may further include an LSP removing module.

The LSP removing module is adapted to remove the new working LSP when the services are switched from the new working LSP back to the original working LSP.

The contents such as information interaction between each module and implementations thereof within the network device are based on the same conception as the method according to the embodiments of the present disclosure, so the specific contents are similar to that described in the above method embodiments of the present disclosure, and the details are not repeated herein again.

In the embodiments of the present disclosure, by adjusting the shared protection bandwidth after protection switching or using the protection LSP as a transition to establish a new LSP for protection switching, dynamic management and maintenance of the shared protection bandwidth of the protection LSP are realized so that the shared mesh can still be flexibly protected against a fault at any position after at least one fault occurs to the network with shared mesh protection. Therefore, this solution is simple and easy to implement and is capable of effectively increasing the utilization rate of bandwidth resources and service survivability.

Through the above description of the embodiments, it is apparent to persons skilled in the art that the present disclosure may be accomplished by hardware, and definitely may also be accomplished by software on a necessary universal hardware platform. Therefore, the technical solutions of the present disclosure may be embodied in the form of a software product or computer program. The software product or computer program may be stored in a nonvolatile, non-transitory computer-readable storage medium (for example, a CD-ROM, a USB flash drive, or a removable hard disk) and contain several instructions adapted to instruct computer equipment (for example, a personal computer, a server, or network equipment) to perform the method as described in the embodiments of the present disclosure.

In addition, the above descriptions are merely specific embodiments of the present disclosure, but not intended to limit the protection scope of the present disclosure. Any modification, equivalent replacement, and improvement made without departing from the principle of the present disclosure shall fall within the protection scope of the present disclosure.

What is claimed is:

1. A method for realizing shared mesh protection, comprising:
- notifying routing information and bandwidth information associated with a working label switching path (LSP) to each node on a protection LSP corresponding to the working LSP if a status change of the working LSP is detected;
- calculating, by each of the nodes, a maximal reserved bandwidth of a link based on the routing information and the bandwidth information and adjusting a shared protection bandwidth of the link according to the maximal reserved bandwidth;
- wherein the detecting of the status change of the working LSP comprising:
  - detecting that a fault occurs to the working LSP, and
- wherein after the detecting of the status change of the working LSP, the method further comprising:
  - switching services on the working LSP to the protection LSP, and the adjusting of the shared protection bandwidth of the link according to the maximal reserved bandwidth comprising:
  - increasing the shared protection bandwidth of the link to a value not smaller than the calculated maximal reserved bandwidth of the link;
  - wherein the notifying of the routing information and the bandwidth information associated with the working LSP to each of the nodes comprising:
  - reporting a fault state and a protection switching state to a control plane of each of the nodes; and
  - generating by the control plane, a signaling message carrying the routing information and the bandwidth information associated with the working LSP, and sending the signaling message on the protection LSP;
  - wherein the signaling message is an extended PATH message, the PATH message carries information associated with a bandwidth occupied by the working LSP, and carries explicit routing information associated with the working LSP;
  - wherein each of the nodes maintains a fault influence table for calculating protection bandwidth reservation information, the fault influence table comprises service bandwidths, having each link connected to each of the nodes which are reserved for other links, a maximal reserved bandwidth and a shared protection bandwidth of each of the links connected to each of the nodes; and
  - adjusting by each of the nodes, the shared protection bandwidth of the link based on the routing information and the bandwidth information, wherein the adjusting comprising:
    - mapping by each of the nodes, links and nodes carried in the explicit routing information about the working LSP in the PATH message to reserved service bandwidths and shared protection bandwidths of links of entries in the fault influence table;
    - respectively subtracting the bandwidth occupied by the working LSP carried in the PATH message from the reserved service bandwidth and the shared protection bandwidth of the link to generate a current reserved service bandwidth and a current shared protection bandwidth of the link of a corresponding entry; and
    - recalculating the maximal reserved bandwidth of the link according to the current reserved service bandwidth and adjusting the current shared protection bandwidth of the link to increase the adjusted shared protection bandwidth to a value not smaller than the maximal reserved bandwidth.

2. The method according to claim 1, wherein after notifying each of the nodes with the routing information and the bandwidth information associated with the working LSP, the method further comprising:
- sending an error message indicating that a needed bandwidth is unable to be increased to an endpoint node of the protection LSP if a node receiving the routing information and bandwidth information associated with the working LSP determines that a rest bandwidth of the link on the protection LSP does not satisfy a demand of the shared protection bandwidth;
- receiving and reporting, by the endpoint node of the protection LSP, the error message to the control plane, and triggering the control plane to establish a new working LSP connected to the endpoint node; and
- switching services on the protection LSP to the new working LSP, and setting a protection relation that the protection LSP protects the new working LSP.

3. The method according to claim 1, wherein after notifying each of the nodes with the routing information and the bandwidth information associated with working LSP, the method further comprising:
- sending an error message indicating that a needed bandwidth is unable to be increased to an endpoint node of the protection LSP, if a node receiving the routing information and bandwidth information associated with the working LSP determines that a rest bandwidth of the link on the protection LSP does not satisfy a demand of the shared protection bandwidth;
- receiving and reporting, by the endpoint node of the protection LSP, the error message to the control plane, and triggering the control plane to establish a new working LSP connected to the endpoint node; and
- switching services on the protection LSP to the new working LSP, and setting a protection relation that the protection LSP protects the new working LSP.

4. The method according to claim 1, wherein after each node increases the shared protection bandwidth of the link based on the received routing information and bandwidth information, the method further comprising:
- establishing an LSP for protecting the protection LSP based on a strategy for realizing shared mesh protection.

5. The method according to claim 1, wherein after each of the nodes increases the shared protection bandwidth of the link based on the received routing information and the bandwidth information, the method further comprising:
- establishing an LSP for protecting the protection LSP based on a strategy for realizing shared mesh protection.

6. A method for realizing shared mesh protection, comprising:
- notifying routing information and bandwidth information associated with a working label switching path (LSP) to each node on a protection LSP corresponding to the working LSP if a status change of the working LSP is detected; and
- calculating, by each of the nodes, a maximal reserved bandwidth of a link based on the routing information and the bandwidth information and adjusting a shared protection bandwidth of the link according to the maximal reserved bandwidth; wherein detecting the status change of the working LSP, comprising:
  after a fault occurs to the working LSP and services on the working LSP switch to the protection LSP, detecting that the fault of the working LSP is recovered,
wherein the method further comprising:
  switching the services on the protection LSP back to the working LSP; and
  adjusting the shared protection bandwidth of the link according to the maximal reserved bandwidth, wherein the adjusting comprising:
  decreasing the shared protection bandwidth of the link to a value not smaller than the maximal reserved bandwidth of the link;
wherein each of the nodes maintains a fault influence table for calculating protection bandwidth reservation information, the fault influence table comprises: service bandwidths that each link connected to each of the nodes reserves for other links, a maximal reserved bandwidth, and a shared protection bandwidth of each of the links connected to each of the nodes; and
wherein the adjusting by each of the nodes, the shared protection bandwidth of the link based on the routing information and the bandwidth information, comprising:
  mapping, by each of the nodes, links and nodes carried in the routing information to reserved service bandwidths, and shared protection bandwidths of links of entries in the fault influence table; and
  respectively, adding the bandwidth occupied by the working LSP with a reserved service bandwidth and a shared protection bandwidth of the link, to obtain a current reserved service bandwidth and a current shared protection bandwidth of the link of a corresponding entry; and
  recalculating the maximal reserved bandwidth of the link according to the current reserved service bandwidth and adjusting the current shared protection bandwidth of the link to reduce the adjusted shared protection bandwidth to a value not smaller than the maximal reserved bandwidth.

7. A non-transitory computer readable storage medium storing a computer program that includes instructions, the instructions causing a processor of a network element device to perform shared mesh protection functions, comprising:
  detecting that a status change occurs to a working label switching path (LSP);
  notifying routing information and bandwidth information associated with the working LSP to each node on a protection LSP corresponding to the working LSP, if a status change of the working LSP is detected;
  calculating by each of the nodes, a maximal reserved bandwidth of a link based on the routing information and the bandwidth information; and
  adjusting a shared protection bandwidth of the link according to the maximal reserved bandwidth;
wherein the detecting of the status change of the working LSP comprising:
  detecting that a fault occurs to the working LSP, and
wherein after the detecting of the status change of the working LSP, the method further comprising:
  switching services on the working LSP to the protection LSP, and the adjusting of the shared protection bandwidth of the link according to the maximal reserved bandwidth comprising:
  increasing the shared protection bandwidth of the link to a value not smaller than the calculated maximal reserved bandwidth of the link;
wherein the notifying of the routing information and the bandwidth information associated with the working LSP to each of the nodes comprising:
  reporting a fault state and a protection switching state to a control plane of each of the nodes; and
  generating by the control plane, a signaling message carrying the routing information and the bandwidth information associated with the working LSP, and sending the signaling message on the protection LSP;
wherein the signaling message is an extended PATH message, the PATH message carries information associated with a bandwidth occupied by the working LSP, and carries explicit routing information associated with the working LSP;
wherein each of the nodes maintains a fault influence table for calculating protection bandwidth reservation information, the fault influence table comprises service bandwidths, having each link connected to each of the nodes which are reserved for other links, a maximal reserved bandwidth and a shared protection bandwidth of each of the links connected to each of the nodes; and
adjusting by each of the nodes, the shared protection bandwidth of the link based on the routing information and the bandwidth information, wherein the adjusting comprising:
  mapping by each of the nodes, links and nodes carried in the explicit routing information about the working LSP in the PATH message to reserved service bandwidths and shared protection bandwidths of links of entries in the fault influence table;
  respectively subtracting the bandwidth occupied by the working LSP carried in the PATH message from the reserved service bandwidth and the shared protection bandwidth of the link to generate a current reserved service bandwidth and a current shared protection bandwidth of the link of a corresponding entry; and
  recalculating the maximal reserved bandwidth of the link according to the current reserved service bandwidth and adjusting the current shared protection bandwidth of the link to increase the adjusted shared protection bandwidth to a value not smaller than the maximal reserved bandwidth.

\* \* \* \* \*